United States Patent
Friman et al.

(10) Patent No.: US 9,733,626 B2
(45) Date of Patent: Aug. 15, 2017

(54) METHOD OF MONITORING AN INDUSTRIAL PROCESS

(75) Inventors: Mats Friman, Tempere (FI); Mika Karaila, Tampere (FI); Ville Hietanen, Hattula (FI)

(73) Assignee: Valmet Automation Oy, Espoo (FI)

( * ) Notice: Subject to any disclaimer, the term of this patent is extended or adjusted under 35 U.S.C. 154(b) by 535 days.

(21) Appl. No.: 14/128,202

(22) PCT Filed: Jul. 11, 2011

(86) PCT No.: PCT/FI2011/050648
§ 371 (c)(1),
(2), (4) Date: Jan. 16, 2014

(87) PCT Pub. No.: WO2013/007866
PCT Pub. Date: Jan. 17, 2013

(65) Prior Publication Data
US 2014/0135947 A1    May 15, 2014

(51) Int. Cl.
*G06Q 40/00* (2012.01)
*G06Q 10/00* (2012.01)
*G06F 17/30* (2006.01)
*G05B 13/04* (2006.01)
*G05B 23/02* (2006.01)

(52) U.S. Cl.
CPC ......... *G05B 13/04* (2013.01); *G05B 23/0243* (2013.01); *G05B 23/0264* (2013.01); *G05B 23/0267* (2013.01)

(58) Field of Classification Search
CPC ........ G05B 13/04; G06Q 40/00; G06Q 40/04; G06Q 10/06; B05B 17/02
See application file for complete search history.

(56) References Cited

U.S. PATENT DOCUMENTS 5,167,010 A    11/1992  Elm et al.
7,593,837 B2    9/2009  Nakaya et al.
(Continued)

FOREIGN PATENT DOCUMENTS

EP    1 394 715 A1    3/2004
EP    1 847 856 A1    10/2007
(Continued)

OTHER PUBLICATIONS

Dasgupta et al., Secure VM for monitoring industrial process controllers, Oct. 2011, 4 pages.*
(Continued)

*Primary Examiner* — Thuy Dao
(74) *Attorney, Agent, or Firm* — Oliff PLC (57) ABSTRACT

A plurality of real control inputs and real process measurements provided by a real automation system controlling an industrial process are continuously stored continuously storing in a historian database. At the same time, a plurality of forecast control inputs and process measurements provided by a virtual automation system based on a simulation model are continuously stored in a futurian database. Both the past operation of the industrial process up to present time based on data from the historian database and the forecast future operation of the industrial process from the present time onwards based on data from the futurian database are displayed on the operator screen.

15 Claims, 10 Drawing Sheets (56) References Cited

U.S. PATENT DOCUMENTS

| | | | |
|---|---|---|---|
| 7,912,809 B2* | 3/2011 | Shteyngarts | G06Q 10/06 707/603 |
| 7,953,585 B2* | 5/2011 | Gurpinar | E21B 43/00 166/250.16 |
| 8,489,487 B1* | 7/2013 | Schoen | G06Q 40/04 705/36 R |
| 8,620,779 B2* | 12/2013 | Keyes, IV | G05B 13/042 705/30 |
| 2002/0177909 A1 | 11/2002 | Fu et al. | |
| 2007/0038333 A1* | 2/2007 | Dadebo | B01D 3/4211 700/270 |
| 2008/0027704 A1 | 1/2008 | Kephart et al. | |
| 2009/0150223 A1* | 6/2009 | Sachedina | G06Q 10/06 705/7.24 |
| 2010/0094770 A1* | 4/2010 | Sachedina | G06Q 10/06 705/348 |
| 2010/0318934 A1 | 12/2010 | Blevins et al. | |
| 2011/0022193 A1* | 1/2011 | Panaitescu | A41D 20/00 700/29 |

FOREIGN PATENT DOCUMENTS

| | | |
|---|---|---|
| JP | H11-272323 A | 10/1999 |
| JP | 2005-332360 A | 12/2005 |
| JP | 2009-009301 A | 1/2009 |
| JP | 2010-015274 A | 1/2010 |
| WO | WO 2008/040845 A1 | 4/2008 |
| WO | WO 2012/001213 A1 | 1/2012 |

OTHER PUBLICATIONS

Salihbegovic et al., Software engineering approach in the design and development of the industrial automation systems, May 2008, 8 pages.*

Mar. 15, 2012 International Search Report issued in International Application No. PCT/FI2011/050648.

Mar. 15, 2012 Written Opinion issued in International Application No. PCT/FI2011/050648.

Friman et al., "Managing Adaptive Process Monitoring: New Tools and Case Examples," Proceedings of the 15$^{th}$ Mediterranean Conference on Control & Automation, Jul. 2007.

"Mutual information," Wikipedia: The Free Encyclopedia, Wikimedia Foundation, Inc., Jun. 2010, http://en.wikipedia.org/wiki/Mutual_information.

Feb. 24, 2015 Office Action issued in Japanese Patent Application No. 2014-519590.

Mar. 11, 2015 Office Action issued in European Patent Application No. 11 770 470.0.

Translation of Dec. 15, 2015 Office Action issued in Japanese Patent Application No. 2014-519590.

* cited by examiner

METHOD OF MONITORING AN INDUSTRIAL PROCESS

FIELD OF THE INVENTION

The present invention relates generally to control of an industrial process by an automation system.

BACKGROUND OF THE INVENTION

A process control or automation system is used to automatically control an industrial process such as chemical, oil refineries, paper and pulp mill, and power plants. The process automation system often uses a network to interconnect various system components, such as sensors, actuators, controllers, and operator terminals. Process automation involves using computer technology and software engineering to help power plants and factories operate more efficiently and safely.

Process simulation is a model-based representation of industrial processes and unit operations in software for studying and analyzing the behavior and performance of actual or theoretical systems. Simulation studies are performed, not on the real-world system, but on a (usually computer-based) model of the system created for the purpose of studying certain system dynamics and characteristics. The purpose of any model is to enable its users to draw conclusions about the real system by studying and analyzing the model response. The major reasons for developing a model, as opposed to analyzing the real system, include economics, unavailability of a "real" system, and the goal of achieving a deeper understanding of the relationships between the elements of the system.

Process simulation always uses models which introduce approximations and assumptions but allow the description of a property over a wide range of properties, such as temperatures and pressures, which might not be covered by real data. Models also allow interpolation and extrapolation—within certain limits—and enable the search for conditions outside the range of known properties. In process automation, the simulator may use measurements to show not only how the plant is working but to simulate different operating modes and find the optimal strategy for the plant.

Simulation can be used in task or situational training areas in order to allow operators to anticipate certain situations and be able to react properly as well as to test and select alternatives based on some criteria, to test why certain phenomena occur in the operations of the system under consideration, to gain insight about which variables are most important to performance and how these variables interact, to identify bottlenecks in the process, to better understand how the system really operates (as opposed to how everyone thinks it operates), and to compare alternatives and reduce the risks of decisions.

A basic process simulator is run with no real-time connection to a simulated process. A tracking simulator, on the other hand, has the ability to adapt its behavior to reality. A tracking simulator is a process simulator that runs in real-time in parallel with the real process and is provided with a connection to the real process. More specifically, the tracking simulator receives process measurements from the real process and is able to correct its own behavior (models) by comparing the real process measurements to the simulator outputs. PCT/FI2010/050564 discloses an example of such tracking simulator.

US2008/0027704 discloses a real-time synchronized control and simulation within a process plant. A simulator is run in parallel with the actual control system and the actual process. The operator can toggle the simulator between two alternative modes of operation: a tracking mode and a prediction mode. In a tracking mode the simulator can correct or update its models based on the data from the real process. In the prediction mode the simulator performs simulation of the process control system over some future time horizon, to perform "what-if" scenarios, for example. In the prediction mode the simulator corresponds to a basic process simulator run with no real-time connection to a simulated process.

Disturbances enter or affect the process and tend to drive the controlled dependent variables away from their desired value or setpoint condition. Typical disturbances include changes in demand for product, or in the supply of feed material. The control system must adjust the dependent variable so the setpoint value of the independent variable is maintained despite the disturbances. If the setpoint is changed, the independent variable must be changed to adjust the controlled variable to its new desired value.

Despite their differences, continuous-process industries share underlying characteristics: they maintain continuous operations in facilities that represent substantial start-up costs and time, but can be interrupted or disrupted by minor disturbances. If the product stream is disrupted or the process is not run optimally, lost productivity and lost product can create a large financial burden. Therefore it is important for the operator to monitor and supervise the process in real-time. Control rooms are central facilities used to manage large systems such as industrial processes. As the operators of large systems are asked to perform more efficiently, use more sophisticated control systems, and take on more duties and responsibilities, developers of control room equipment have sought to improve operators' ability to interact effectively with their systems.

Modern process plants generate a vast amount of real-time data that often has to be stored and processed efficiently for later analysis. All measurements, setpoints, controller outputs, device statuses, motor starts, alarms, operation tracking etc. may be stored into so called historian databases. A historian database may be integrated with other parts of a control system, such as controls, engineering and control room functionalities. By means of the history data collected from the process plant over time, trend charts can be created that show process trends in data over time. In modern control rooms, long history trends are usually available for the users. As all processes vary, single point measurements can be misleading. Displaying historical data over time increases understanding of the real performance of a process.

BRIEF DESCRIPTION OF THE INVENTION

An object of the present invention is to provide an improved monitoring scheme for an industrial process. This object of the invention is achieved by the subject matter of the attached independent claims. The preferred embodiments of the invention are disclosed in the dependent claims.

An aspect of the invention is a method of monitoring an industrial process, comprising continuously storing in a historian database a plurality of real control inputs and real process measurements provided by a real automation system controlling an industrial process, continuously storing in a futurian database a plurality of forecast control inputs and process measurements provided by a virtual automation system based on a model of the industrial process, and displaying on a graphical user interface in a same graphical trend view both the past operation of the industrial process up to present time based on data from the historian database and the forecast future operation of the industrial process from the present time onwards based on data from the futurian database.

According to embodiments of the invention, real control inputs and process measurements in the historian database overwrite or replace the respective forecast control inputs and process measurements with the same timestamp in the futurian database in a real time.

According to embodiments of the invention, the method comprises storing future actions and/or setpoints in the futurian database and displaying respective trends on the graphical user interface.

According to embodiments of the invention, the method comprises providing collaborative data to or from another automation system, said collaborative data including one or more of: future action, future setpoint, future trend, future process measurement, future process control, future alarm, storing the collaborative data in the futurian database, using the collaborative data in generating and displaying the graphical trend view.

According to embodiments of the invention, the method comprises tracking a state of the real automation system in the virtual automation system.

According to embodiments of the invention, the method comprises tracking a process state of the real process in forecasting or simulation in the virtual automation system.

According to embodiments of the invention, the method comprises generating the forecast control inputs and process measurements in said virtual automation system at a speed faster that a real-time speed of real control inputs and process measurements.

According to embodiments of the invention, the method comprises generating and displaying on the graphical user interface future alarms based on data stored in the futurian database.

According to embodiments of the invention, the method displaying on the graphical user interface a timeline control tool, the user using the timeline control tool to move both back in time to analyze past events in the historian database and forth in time to analyze future events in the futurian database with a desired resolution and/or a desired time span of the data.

A further aspect of the invention is a system for implementing a method according to any one of above embodiments, comprising a real-time automation system connected to an industrial process, a virtual automation system capable of running faster than real-time, a graphical user interface, a historian database and a futurian database.

Another aspect of the invention is a computer program comprising program code for performing a method according to any one of above embodiments when said program is run on a computer.

Another aspect of the invention is a computer program product comprising program code means stored on a computer readable medium for performing a method according to any one of above embodiments when said program product is run on a computer.

BRIEF DESCRIPTION OF THE DRAWINGS

In the following the invention will be described in greater detail by means of exemplary embodiments with reference to the attached drawings, in which.

EXAMPLE EMBODIMENTS OF THE INVENTION

Figure 1:
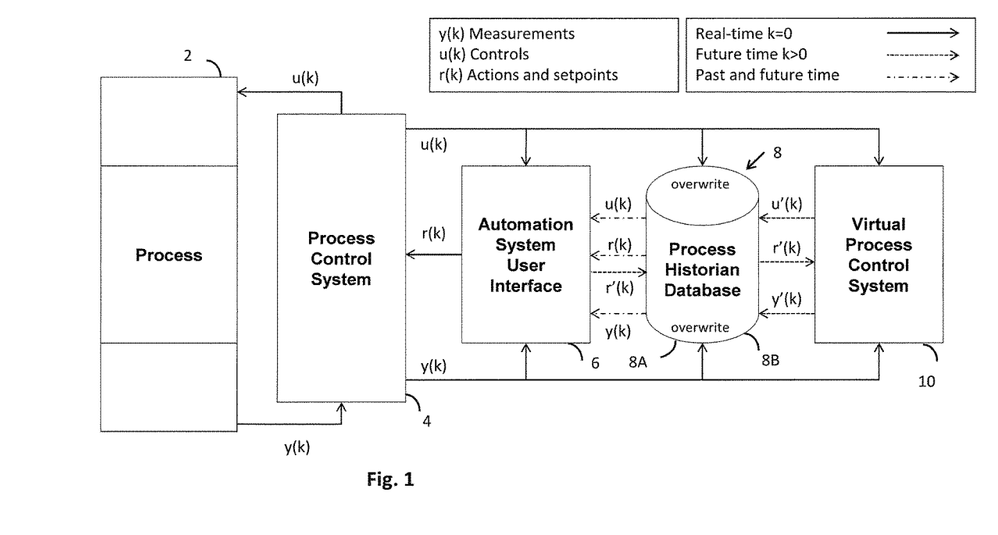
FIG. 1 is a block diagram illustrating a system according to an exemplary embodiment of the invention.

An exemplary embodiment of the invention is illustrated in FIG. 1. The present invention can be applied in connection with any automation system (process control system) 4 and any industrial process 2 or the like. The industrial processes 2 may include, but are not limited to, processes in a processing industry, such as pulp and paper, oil refining, petrochemical and chemical industries, or processes in power plants, etc. There are various architectures for an automation system. For example, the automation system 4 may be a Direct Digital Control (DDC) system, a Distributed Control System (DCS), or Field Control System (FCS), all well known in the art. One example of such a decentralized automation system is Metso DNA (DNA, Dynamic Network of Applications) delivered by Metso. A central processing unit(s) of an automation system controlling the productive activity of an entire factory, such as a paper mill, is (are) often called a control room, which may be composed of one or more control room computer(s)/programs and process control computer(s)/programs as well as databases of an automation system. An automation system 4 may comprise a process bus/network and/or a control room bus/network, by which different process control components or computers are coupled to one another. A control room bus/network may interconnect the user interface components of the automation system 4. A control room bus/network may be a local area network, for example, based on the standard Ethernet technology. A process bus/network may, in turn, interconnect process control components. A process bus/network may be based on a deterministic token passing protocol, for instance. Process controllers may also be connected to a control room network, allowing communication between process controllers and user interfaces. It must be appreciated, however, that it is not the intention to limit the application area of the invention to any specific implementation of an automation system 4.

A process 2 that is controlled by an automation system 4 may typically include a high number of field devices, such as actuators, valves, pumps and sensors, in a plant area (field). There are various alternative ways to arrange an interconnection between an automation system 4 and a process 2 (e.g. field devices), such as two-wire twisted pair loop (4 to 20 mA analog signal), HART (Highway Addressable Remote Transducer) protocol, and other field buses (e.g. Fieldbus and Profibus). However, it is to be appreciated that the type or implementation of an interconnection between an automation system 4 and a process 2, e.g. between a control room and field devices, may be based on any one of the alternatives described above, or on any combination of the same, or on any other implementation. A practical plant configuration may, and typically does, include several types of automation lines or field buses in parallel, since the plant is updated and extended gradually over a long period of time.

Process measurements y(k) may include any measurement of any desired variables or properties in a process 2, such as a flow rate, a pressure, a temperature, a valve position, etc. These process variables can be measured with dedicated sensors arranged in the field of a process plant. Process controls (inputs) u(k) from an automation system 4 to a process 2 may include, but are not limited to, control inputs to field devices.

An operator or user may monitor and control the automation system 4 via the user interface 6 of the automation system. Through the user interface user may monitor displayed measurement data y(k) and process controls u(k) received from the automation system 4 and provide actions and setpoints to the automation system 4. In the exemplary embodiment shown in FIG. 1, the measurement data y(k), the process controls u(k) and the actions and setpoints r(k) may be stored into database(s) 8, or a portion of the database 8 called historian database(s) 8A. The historian data may include part or all of measurements, setpoints, controller outputs, device statuses, motor starts, alarms, operation tracking etc. obtained from the automation system and the process during operation. The database 8 may be a database commonly referred to as a tag database, which contains data elements called tags or points. A tag may represent a single input or output value monitored or controlled by the system 4. A tag can be either "hard" or "soft". A hard tag represents an actual input or output within the system 4, while a soft tag results from logic and math operations applied to other points. Tags are normally stored as value-timestamp pairs: a value, and the timestamp when it was recorded or calculated. A series of value-timestamp pairs gives the history of that tag. Optionally the history database 8 may store additional metadata with tags, such as alarm information. A history database 8 may store data from a huge amount of tags, e.g. thousands or dozens of thousands over a long period of time (length of the history), the main limiting factor being the storage capacity of the database. The collection cycle for tags, i.e. the time between the collection (sampling) of two samples, may be selectable by the user, e.g. from approximately 0.1 seconds up to days or weeks. There may be different collection cycles and/or history lengths for different tags or different users, for example. The length of the trend history is limited by the available database capacity, e.g. hard disc space. According to an exemplary embodiment, the historian database may be a round buffer i.e. older data is automatically deleted and overwritten if the database reaches its maximum storing capacity.

The operator user interface 6 in a control room may be based on a human-machine interface (HMI) running in the operator console and allowing the user to monitor, supervise and control the process. The aim of the operator user interface is effective operation and control of the plant systems, typically by means of keyboard and mouse controlled displays on which a vast amount of process information is graphically presented (graphical user interface, GUI). The primary aspects of this interface are graphics animated with feedback from the process which aids the operator in making operational decisions, e.g. make actions and change setpoints to operate the process. The operator user interface may also include data browsing and analyzing utilities, configuration tools and alarm display. In steady operation, the operator interface displayed in the main control room may show the synthetic and functional state of the plant system. At one glance, the operator may be able to know the overall state of the plant system—i.e. the global state of all the components. If a problem occurs, the controlled component appears in error and the operator may access its detailed state, for instance opening a display that is specific to the supervised component. This interface may help the operator to locate the origin of the fault and shall suggest a corrective action if possible. In the operator user interface, it is desired that the displayed information should be organized purposefully, in meaningful and useful ways based on clear, consistent models that are apparent and recognizable to operators, putting related things together and separating unrelated things, differentiating dissimilar things and making similar things resemble one another.

Figure 2:
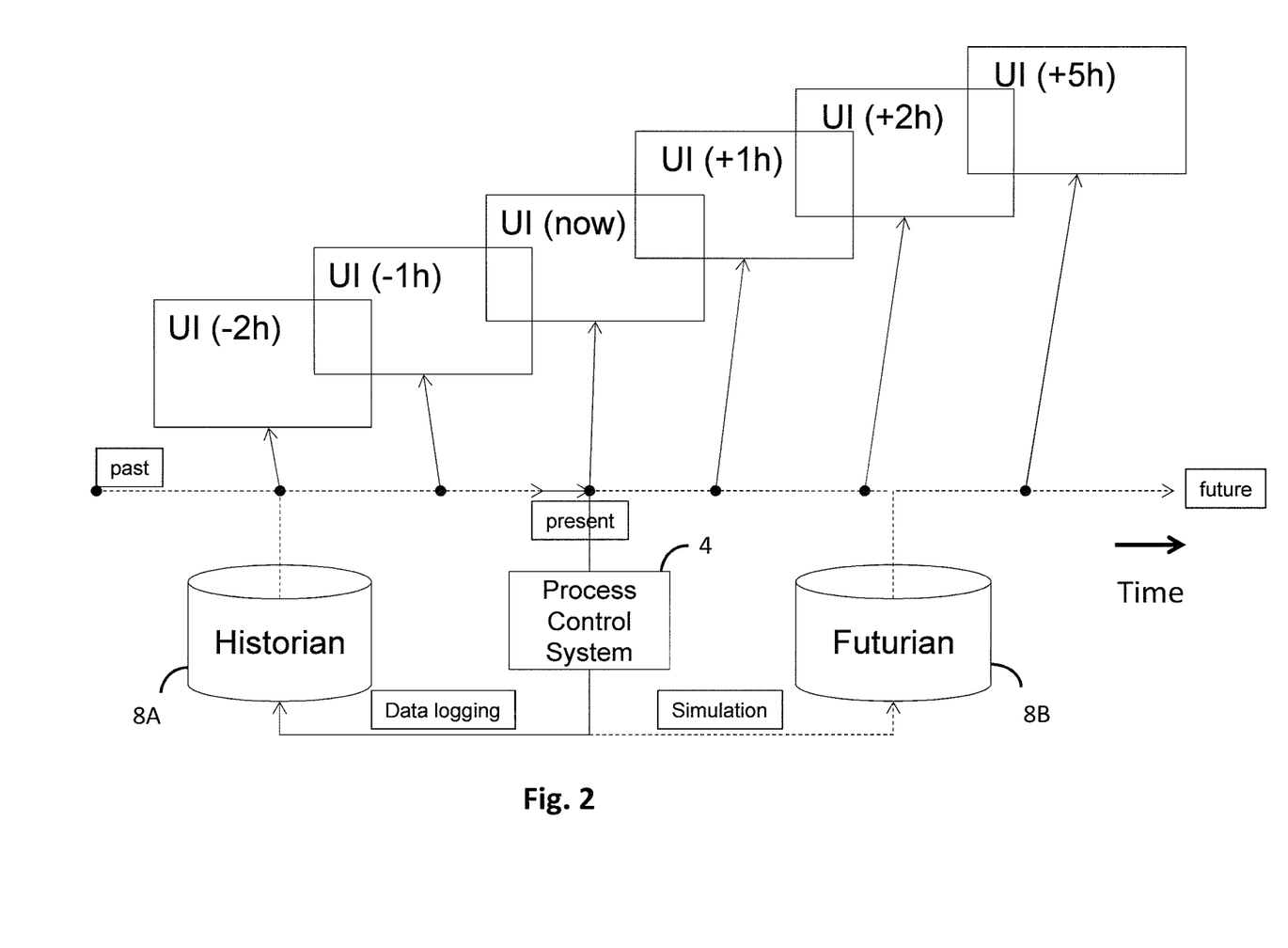
FIG. 2 is a simplified block diagram illustrating an example of storing of tags in the historian database and the futurian database.

In order to provide an improved user interface environment for an operator in a process industry, according to exemplary embodiments of the invention, also forecast control inputs u'(k), forecast process measurements y'(k), and forecast actions and setpoints r'(k) may be provided and stored in the history database 8. The stored forecast data is also called as futurian data herein, and the portion of the database 8 that stores the futurian data is also called as a futurian database 8B. The forecast actions and setpoints r'(k) may be made or set by the operator via the operator user interface 6. The forecast control inputs u'(k), the forecast process measurements y'(k), and any other futurian data may be generated by a virtual automation system, such as a virtual automation system that utilizes a process model and a simulator, or a virtual automations system that is based on statistical prediction, e.g. regression model and/or entropy. In other words, the historian database portion 8A stores process history data collected from the past operation of the industrial process up to present time (i.e. current real-time situation), whereas the futurian database portion 8B stores forecasted process "history" data representing the future operation of the industrial process from the present time (i.e. current real-time situation) onwards to the future over a desired time span. This is schematically illustrated in FIG. 2, wherein the tags collected from the system at present instant UI(now), one hour earlier in the past UI(−1 h), and two hours earlier in the past UI(−2 h), etc., are stored in the historian database 8A. Similarly, the futurian tags that simulate/forecast the future operation of the process one hour later in the future UI(+1 h), two hours later in the future UI(+2 h), . . . , 5 hours later in the future UI(+5 h), etc., are stored in the futurian database 8B. One collection cycle later in time, the historian data tags from the real process will overwrite (i.e. replace) the futurian tags with the same timestamp previously stored in the futurian database 8B. Referring to the example shown in FIG. 2, a real process tag collected one hour later in time, i.e. at time +1 h, would overwrite/replace the previous stored futurian tag UI(+1 h) having the same time stamp +1 h. It should be appreciated that the historian database 8A and the futurian database 8B may be virtual databases, and the border between the historian database 8A and the futurian database 8B may be defined merely based on the timestamp, i.e. time stamps from past to the present (now) point to the historian database 8A, and time stamps later than the present point to the futurian database 8B. The border is thus continuously sliding with the real-time (now). The physical configuration of the history database 8 is not relevant, but it may comprise a single continuous buffer database (such as round buffer), a pair of a continuous historian buffer database and a continuous futurian buffer database which may overlap each other in time at the border area, a distributed database, or any other database configuration.

Figure 3A:
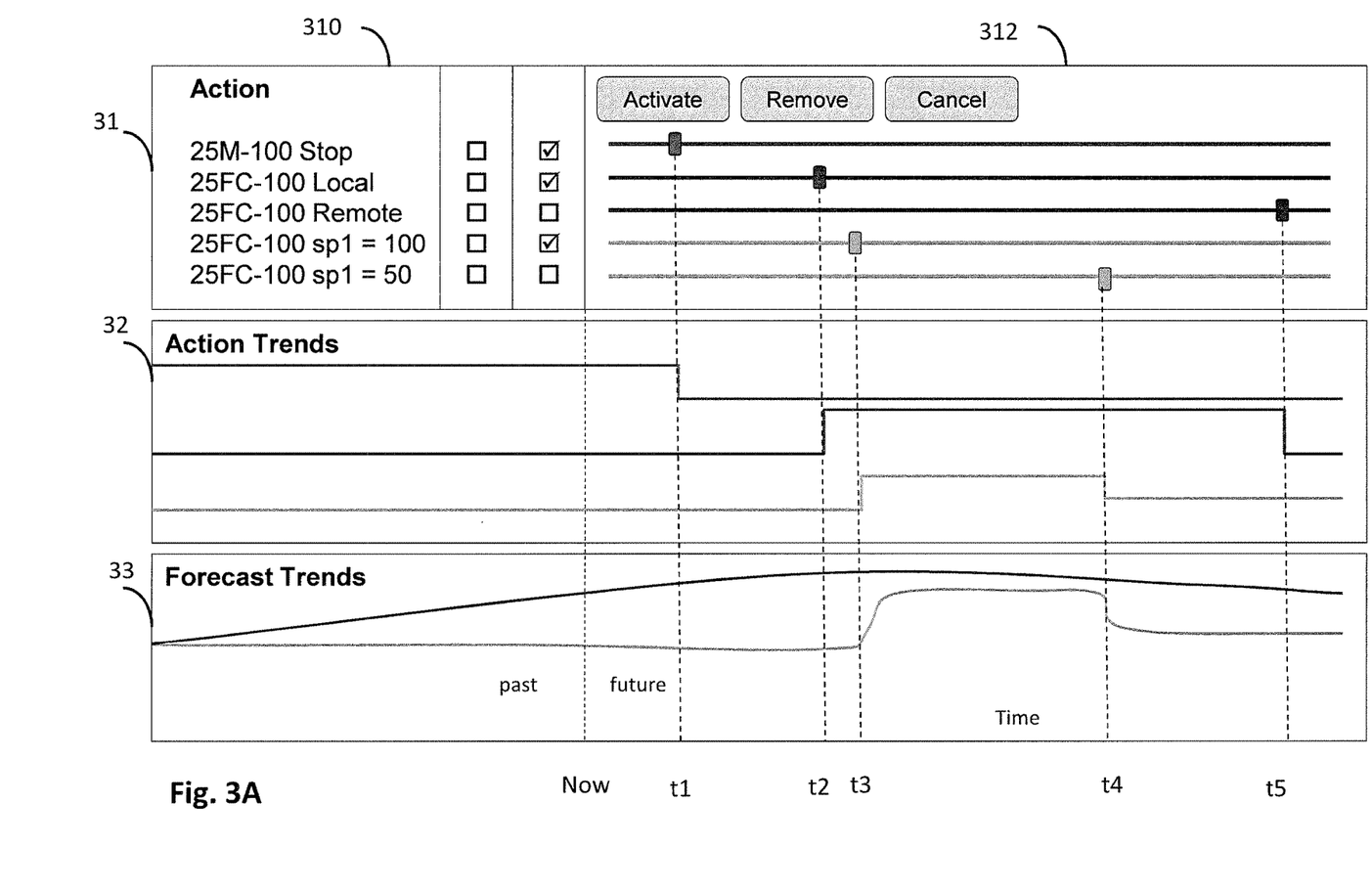
FIG. 3A illustrates an exemplary trend view that may be displayed on an operator user interface in according to exemplary embodiments of the invention.
Figure 4:
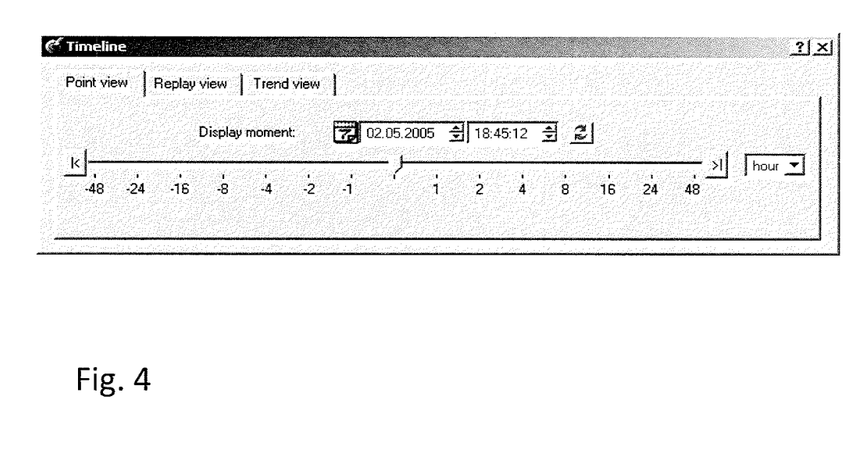
FIG. 4 shows an example of a timeline and zooming tool displayed on the graphical user interface.

FIG. 3A illustrates an exemplary trend view that might be displayed on an operator user interface 6 in accordance with principles of embodiments of the invention. In the example view, there may be three different windows or zones: Actions 31, Action trends 32, and History trends 33. In the example, the Actions window 31 may display an action list 310 including actions for process components 25M-100 and 25FC-100, such as pumps, and control tools 312 for setting real-time and future actions and setpoints r(k) and r'(k). The Actions trend window 32 may show the actions graphically as trends in a time line including past (historian) actions and setpoints from trends from past to the present time (now) and forecast (futurian) actions and setpoints from the present time to the future. Similarly, the History trends window 33 may show history trends including a historian trend portion for past (historian) measurements y(k) and controls u(k) up to the present time (now), and a forecast trend portion for forecast (futurian) measurements y'(k) and controls u'(k). Therefore, future trends (forecast trends) may be displayed on the same screen (e.g. in the same graph or plot) and in the same timeline as any other trend from the process history database. In other words, the history trends displayed on an automation system user interface may be extended to include also trend forecasts (and with alarms and events) in the same picture with a common timeline. Having future actions and trends displayed on the screen, it is easier to manage a process situation as compared with a situation where all future actions and trends have to be kept in mind, or without knowledge of future actions or trends. Also a recovery from a problematic situation will be faster, as the consequences of corrective action made in real-time or set to be made in the future are displayed on the same screen. The operator can see immediately what happened or will happen in a certain process situation and how the sequence of events proceeded or will proceed. By using the timeline and zooming functions, the operator may move back and forth in time with the desired resolution of the data. The operator may 'replay' both the past and future events stored in the history database 8. A time line and zooming tool may be, for example a graphical slide controller in which a pointer or an adjusting 'knob' can be slided along the time line to the desired point in the past or to the future wherein more detailed process data stored in the history database 8 can be displayed to analyze the process situation. An example of such graphical timeline and zooming tool is illustrated in FIG. 4. Also future alarms may forecasted and stored in the futurian database or an alarm list, so that the operator may obtain alarms of problematic situations that might occur in the future, if the process continued from the present situation determined by the historian data to the future with existing and/or future actions and setpoints. Examples of such alarm forecast may include an alarm of a lack of raw material or an alarm of a waste tank being full, but any alarm may be forecast depending on the specific process in question.

Let us consider the exemplary trend view shown in FIG. 3A in more detail. By means of the control slides and 'Activate', 'Remove' and 'Cancel' buttons, the operator may have set the following future actions r'(k) which are written in to the futurian database 8B with future timestamps: 25M-100 will stop at time instant t1; 25FC-100 will enter a Local mode at time instant t2; 25FC-100 will be controlled to a level sp1=100 at time instant t3; and 25FC-100 will be controlled to a level sp1=50 at time instant t4; and 25FC-100 will return to a Remote mode at time instant t5. These future actions are also shown in the Action trend window 32. The forecast measurements y'(k) and controls u'(k) which are calculated based on the historian (real) data and the future actions r'(k) and are stored in the futurian database 8B, are shown in the future part of the history trends in the window 33. Thus, an operator user interface according to embodiments of the invention can show the cumulative consequences of the past and future actions by future trends so that the operator is able to see the consequences in advance before they are realized in the real process. The future control actions and trends can be displayed on the screen at the same time as the other historical data and the operator is continuously aware of the future consequences without having to remember them or toggle between a real mode and a future mode.

Figures 3B, 3C:
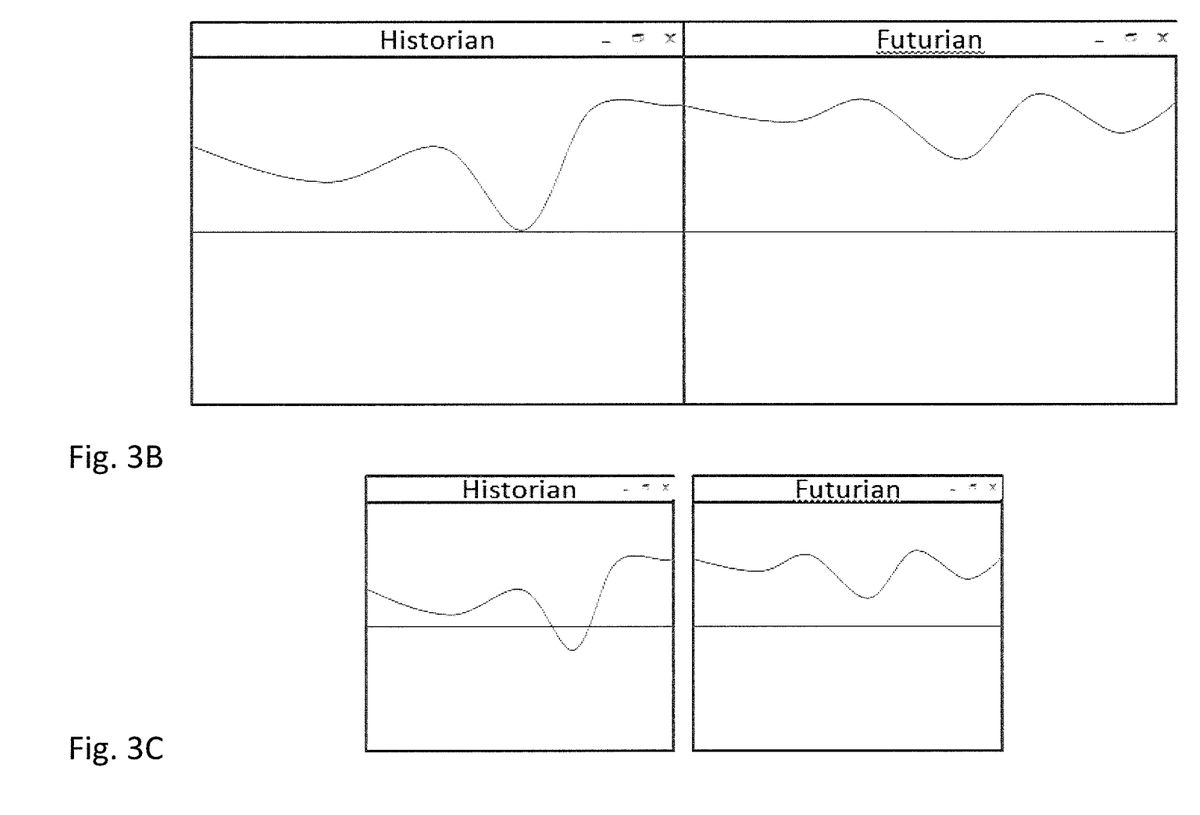
FIGS. 3B, 3C, 3D, 3E, 3F illustrate further examples of displaying historian and futurian data on a graphical user interface.
Figure 3D:
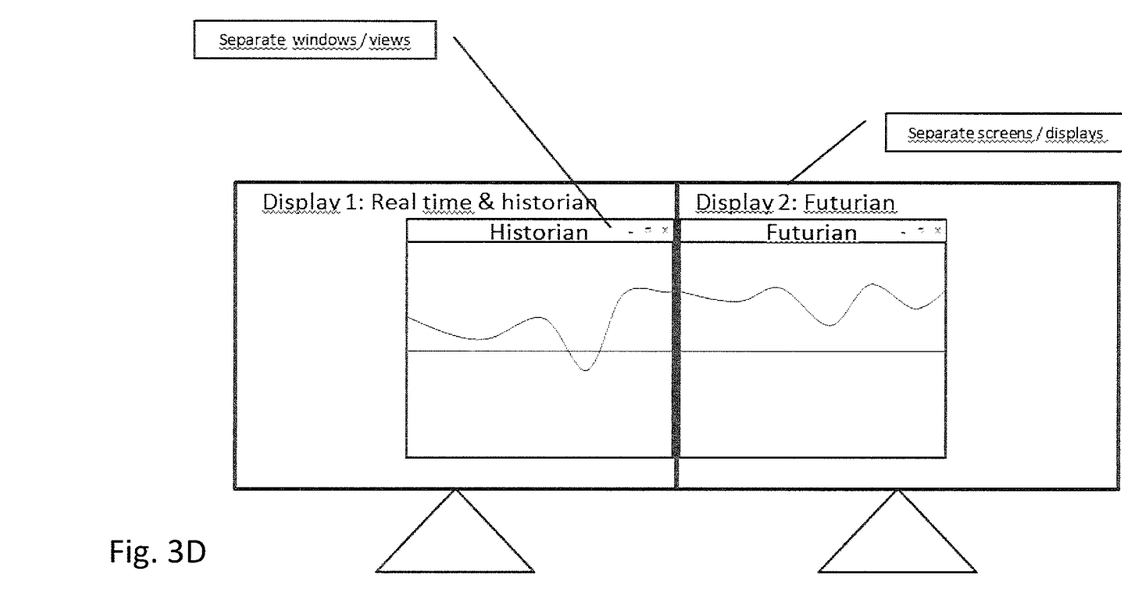

It should be appreciated that principles of embodiments of the invention may applied to provide any type of graphical futurian presentations for the operator, FIG. 3A illustrating only one example. As a further example, historian and/or futurian data may be displayed using any graphical graph or data presentation, such as histogram charts, pie charts, bar charts, line charts, other type of charts, trends, etc. Historian data and futurian data may be shown in a single window or historian data and futurian data may be shown in separate windows on the same screen. Such separate historian and futurian windows may be close each other such that they create a continuous trend on the screen, as illustrated in FIG. 3B, or they may be located horizontally or vertically apart from each other on the screen, as illustrated in FIG. 3C. As still further example, separate historian and futurian views or windows may be displayed on separate screens, as illustrated in FIG. 3D. User may be able to open and close (activate and deactivate) historian and/or futurian window(s) selectively on any control view currently displayed on the screen.

Figure 3E:
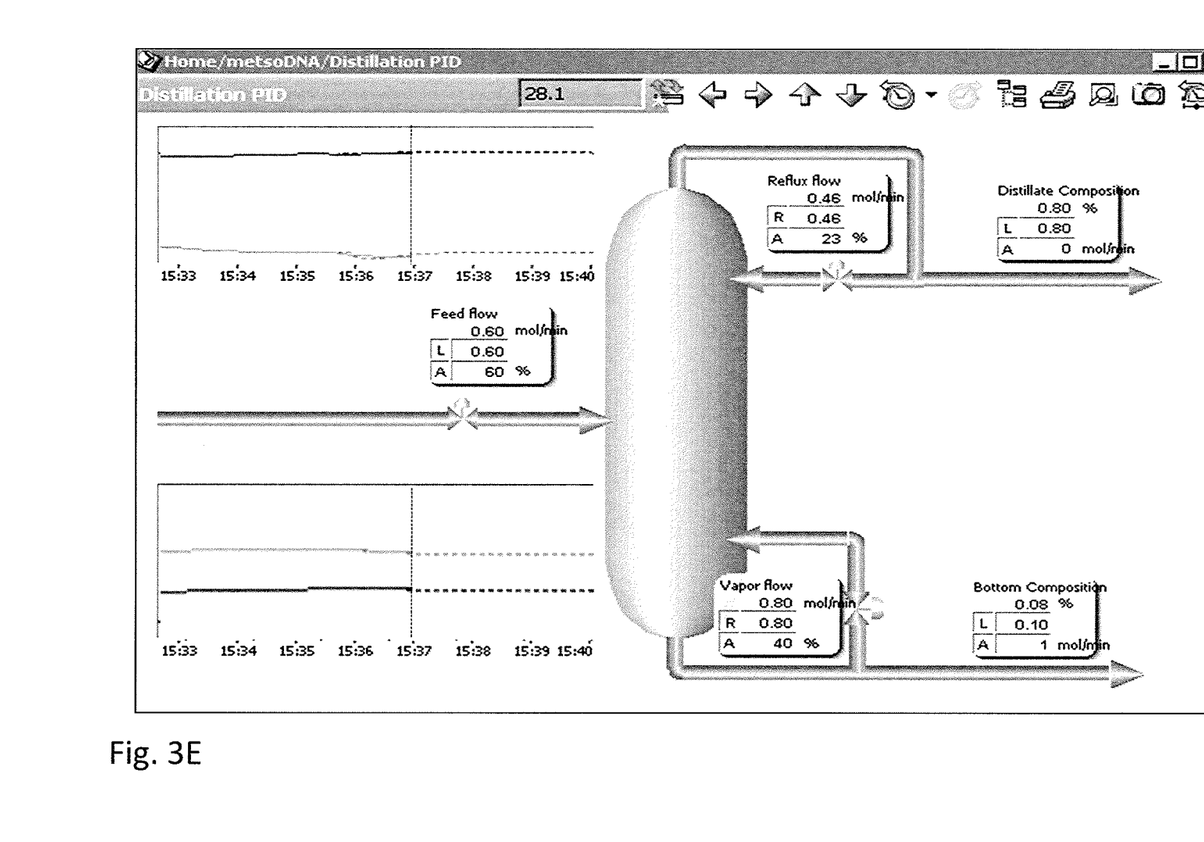

FIG. 3E illustrates an example view, wherein historian and futurian data are displayed as part of a process control view including a graphical presentation of process components. In the illustrated example historian and futurian data of a distillation process are depicted as united trends, wherein the historian data is depicted as a solid line and the historian data is depicted as a broken line. Similarly historian and futurian data may be displayed as part of any process control view.

Figure 3F:
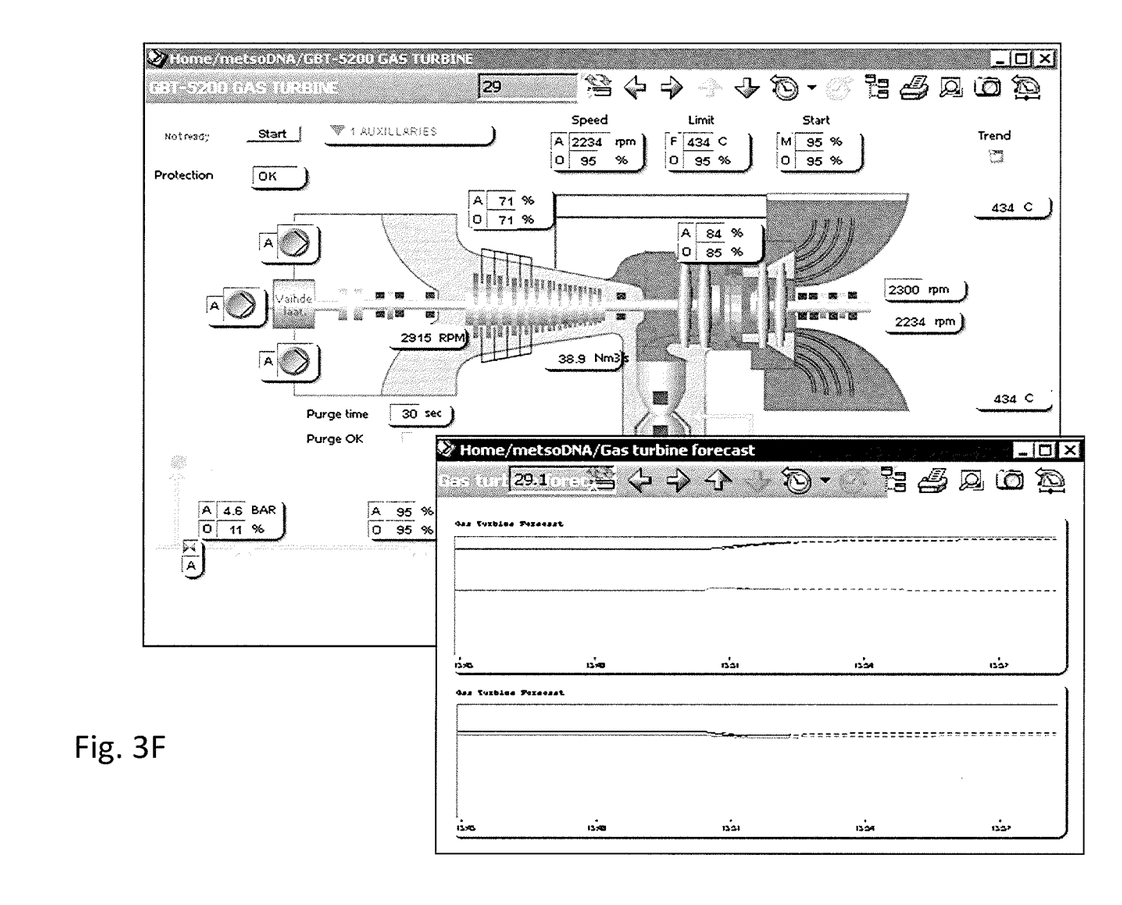

FIG. 3F illustrates a still another example view, wherein historian and futurian data are displayed as part of a process control view including a graphical presentation of process components. In the illustrated example historian and futurian data of a gas turbine are depicted in separate window opened on a gas turbine control view currently displayed on the screen, e.g. by user clicking a desired icon or component on the gas turbine control view. The user may close the historian and futurian window e.g. by clicking an appropriate icon in the window. Similarly historian and futurian data may be selectively displayed as part of any process control view.

Figure 5:
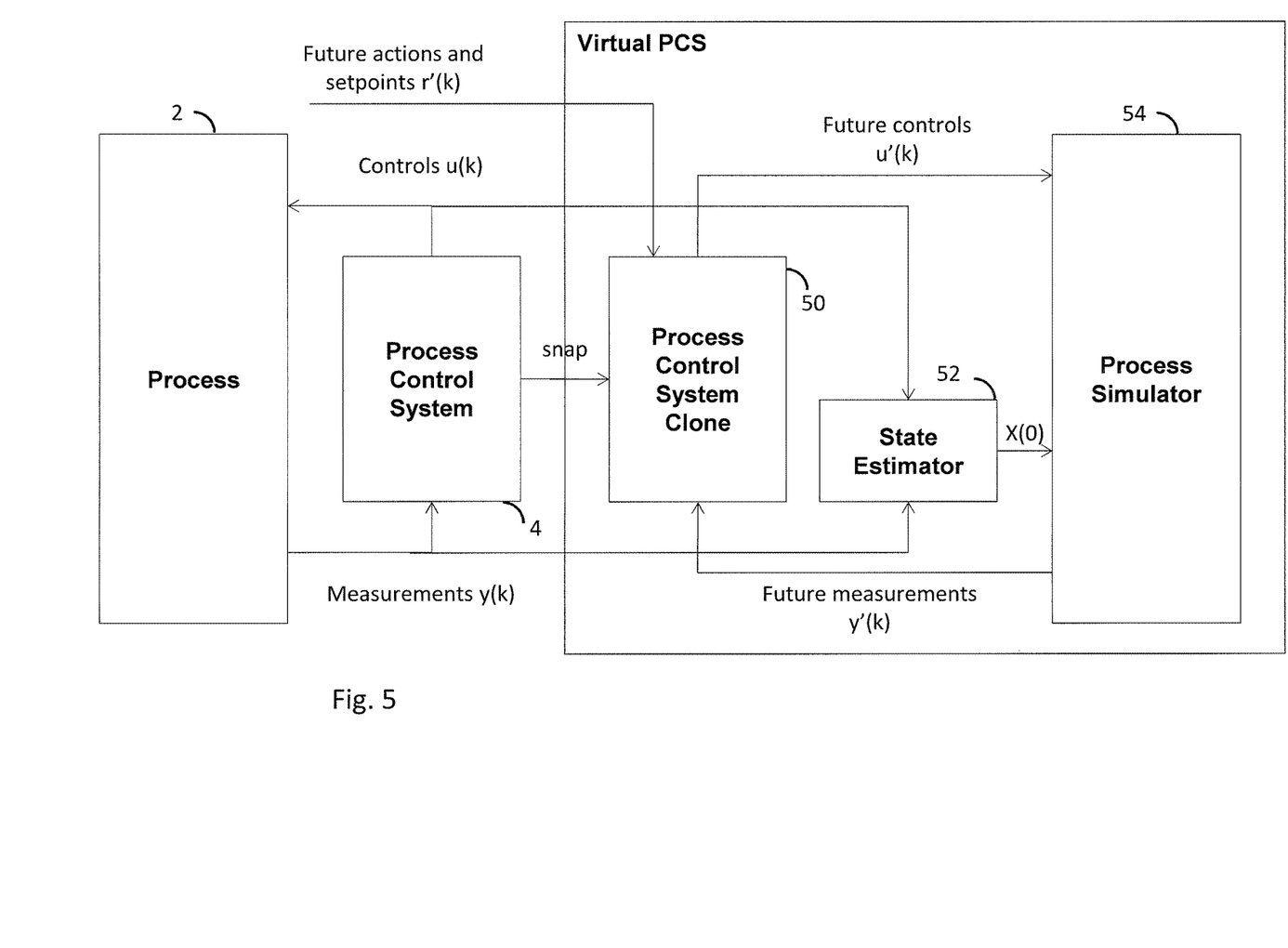
FIG. 5 is a block diagram illustrating a virtual automation system according to an exemplary embodiment of the invention.

A virtual automation system 10 according to a still further exemplary embodiment of the invention is illustrated in FIG. 5. The exemplary virtual automation system 10 may comprise a clone (copy) of process control system 50, a state estimator 52 and a simulator/forecaster 54. The unit process model of the simulator 54 may comprise a description of simulator states (x), a list of controls and disturbances (u), a list of measurements (y), a function (f) describing state update, a function (g) describing mapping from state (x) to measurements. The process model may be a discrete-time model to ensure rapid simulations, but also other type of models may be used. The process model may be a non-linear or linear model. The state estimator 52 may receive the measurements y(k) and controls u(k) at time instant k (timestamp k), and generate the next states x(k+1) for the next time instant k+1 (timestamp k+1) using the function x(k+1)=f(x(k),u(k)), for example. The estimator 52 may have set an estimator gain (H) defining how the generated states are updated from the actual measurements. The simulation starts from the current real-time situation (timestamp k=0). The simulation may typically be performed at higher speed, such that the forecast trends over the desired time span will be obtained and updated as rapidly as possible. A simulator 54 may generate future measurements y'(k) from the state x and the future controls u'(k) using the function y(k+1)=g(x(k+1)), for example. The clone of virtual automation system 50 may receive forecast measurements y'(k) and future actions and settings r,(k) for a time stamp k, and generate forecast controls u'(k+1) for a time stamp k+1. All future or forecast data is stored in the futurian database with respective timestamps. At the same time, the state of simulator may track the state of the real process 2 and the real automation system 4. Thus, the simulation may always start from the current real-time situation, and a hot start of the simulation is possible, as the simulator is always ready for what-if analyses. An exemplary forecast process for a time span from k=0 to kmax may be illustrated by a loop:

Repeat
x=f(x,u);
y=g(x);
z=F(z,y,r);
u=G(z);
k=k+1;
until k>kmax

Figure 6:
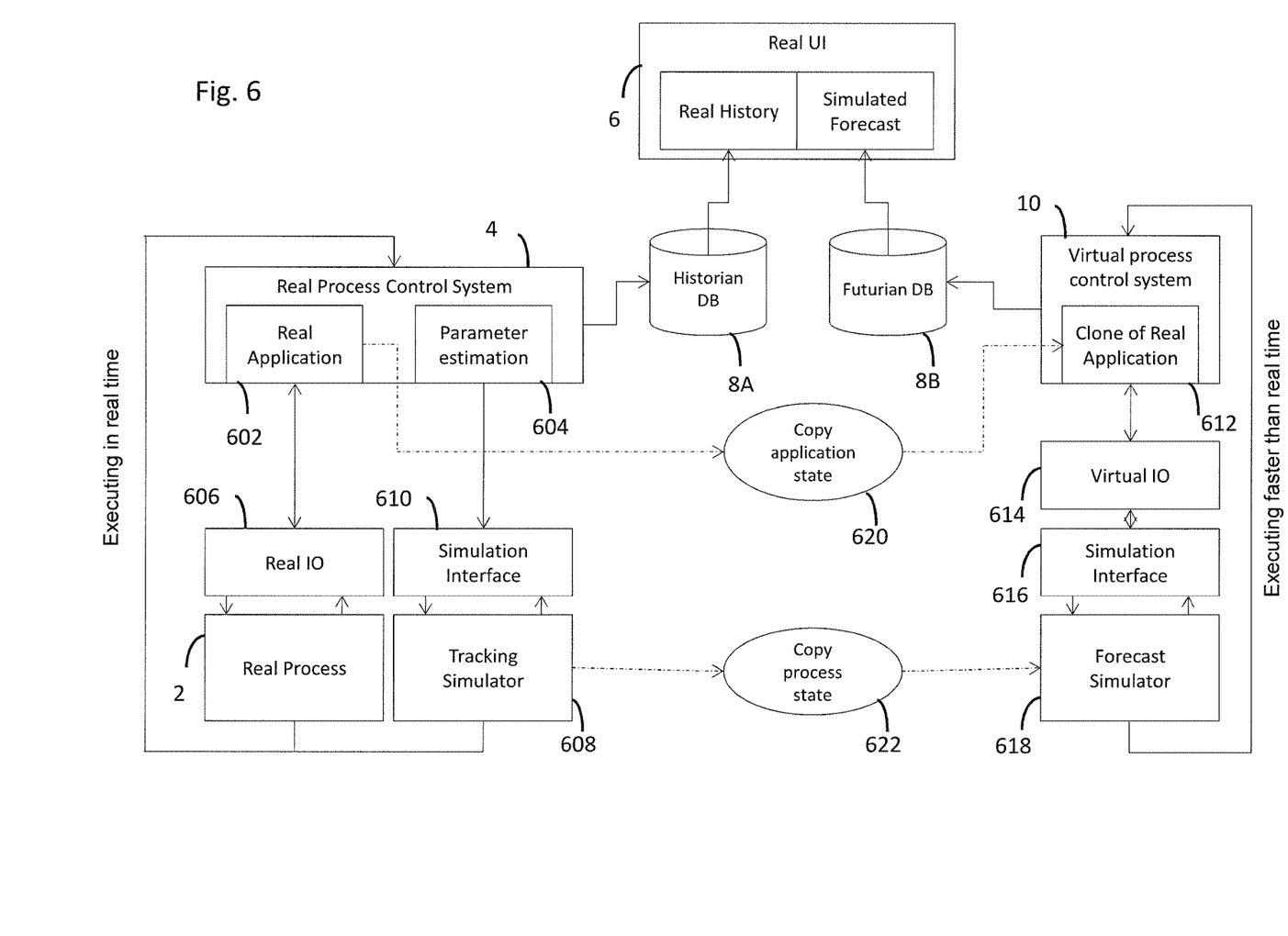
FIG. 6 is a block diagram a system according to a still further exemplary embodiment of the invention.

The parameter z(k) denotes an application state of the process control system 4. A still further exemplary embodiment for implementation of the present invention is shown in FIG. 6. A real automation system (e.g. process control station, PCS) 4 with a real control application 602 controls real industrial process 2 via a real process interface 606 in a manner similar to FIG. 1. The collected history data, i.e. the measurement data y(k), the process controls u(k) and the actions and setpoints r(k) may be stored into a historian database(s) 8A. A tracking simulator is provided that models an industrial process 2 simultaneously and in parallel with the industrial process 2. The tracking simulator 602 may receive via simulation interface 610 the same controls as the controls provided by an automation system 2 to the real industrial process 2. Based on these inputs, the tracking simulator 608 with its process model(s) may provide simulated (estimated) process outputs which represent the real process outputs as accurately as possible with the process model(s) employed. In order to avoid divergence of the model(s) from the real process 2, the parameter estimation part 604 is able to correct, i.e. update, the parameters and behavior (models) of the tracking simulator 608 based on the difference between the outputs from real process 2 and the tracking simulator 608.

A virtual automation system (virtual process control system) 10 with a clone of the real control application may control a forecast simulator 618 via a virtual control I/O 614 and a simulation interface 616. The forecast control inputs u'(k), forecast process measurements y'(k), and forecast actions and set-points r'(k) may be stored in the futurian database 8B by the virtual process control system 10. A copy 620 of the application state of the real control application 602 in the real process control system 4 should be copied to the clone control application in the virtual process control system 10 before each simulation in order to keep the real-time state of the virtual process control system 10 updated and in synchronism with the real process control system 4. Moreover, a copy 622 of the process state of the tracking simulator 608 should be copied to the forecast simulator 618 before each simulation to ensure that simulation starts from a state that is as close to the real process as possible.

In embodiments of the invention, there may also be communication and collaboration between different departments or unit processes at the industrial plant. A forecast obtained from one department or unit process may be valuable information to another department or unit process. Thus, selected one or ones of the future actions and setpoints r'(k), or of other futurian data, may be received from another department or process. For example, the virtual automation system 10 may receive information that a new shipment of raw material will arrive at a certain timestamp, or raw material will be changed, or end product will be shipped at certain time, or an operator of the other process or department will make a certain action that will affect on the process forecast. Similarly, such collaborative information may transferred from the own system to other systems. Such collaboration will improve the accuracy of the forecast and help avoiding unexpected process situations which results from actions in other departments or unit processes.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:

1. A method of monitoring an industrial process, comprising
storing in a historian database a plurality of real control inputs and real process measurements provided by a real automation system controlling an industrial process, storing in a futurian database a plurality of forecast control inputs and process measurements provided by a virtual automation system based on a model of the industrial process, and displaying on an operator display graphically both the past operation of the industrial process up to present time based on data from the historian database and the forecast future operation of the industrial process from the present time onwards based on data from the futurian database.

2. A method according to claim 1, wherein new real control inputs and process measurements with a certain timestamp overwrite or replace the respective forecast control inputs and process measurements stored with the same timestamp in the futurian database.

3. A method according to claim 1, comprising storing future actions, setpoints and/or alarms in the futurian database and displaying respective graphics on the operator screen.

4. A method according to claim 1, comprising
providing collaborative data to or from another automation system, said collaborative data including one or more of: future action, future setpoint, future alarm, future operation, future process measurement, future process control,
storing the collaborative data in the futurian database,
using the collaborative data in generating and displaying graphics about the future operation.

5. A method according to claim 1, comprising
tracking a state of the real automation system in the virtual automation system.

6. A method according to claim 1, comprising
tracking a process state of the real process in forecasting or simulation in the virtual automation system.

7. A method according to claim 1, comprising
generating the forecast control inputs and process measurements in said virtual automation system automatically in the background at a speed substantially higher that a real-time speed of real control inputs and process measurements.

8. A method according to claim 1, comprising
generating the forecast control inputs and process measurements in said virtual automation system in response to operator-implemented changes in at least one predetermined parameter.

9. A method according to claim 1, comprising
generating and displaying on the operator display future alarms based on data stored in the futurian database.

10. A method according to claim 1, comprising
displaying on the operator display a timeline control tool, the operator using the timeline control tool to move both back in time to analyze past events in the historian database and forth in time to analyze future events in the futurian database with a desired resolution and/or time span.

11. A method according to claim 1, comprising
displaying on the operator display the historian and/or futurian data with one or more of the following graphical graphs or data presentations: histogram chart, pie chart, bar chart, line chart, trend, and like.

12. A method according to claim 1, comprising
displaying on the operator display the historian and/or futurian data in a single common window or in separate windows.

13. A method according to claim 1, comprising
the user selectively opening and closing historian and/or futurian window or windows on a process control view displayed on the operator display.

14. A system, comprising:
a real-time automation system connected to an industrial process to control the industrial process;
a historian database storing a plurality of real control inputs and real process measurements provided by the real automation system controlling the industrial process,
a virtual automation system simulating the industrial process with a model of the industrial at a rate faster than the real-time automation system and providing a plurality of forecast control inputs and process measurements based on the model of the industrial process;
a futurian database storing the plurality of forecast control inputs and process measurements provided by the virtual automation system; and
a graphical user interface configured to display both a past operation of the industrial process up to present time based on data from the historian database and a forecast future operation of the industrial process from the present time onwards based on data from the futurian database.

15. A non-transitory computer readable storage device comprising instructions thereon executable by a computer operably coupled to the storage device which, when executed by the computer, carry out the functions of:
storing in a historian database a plurality of real control inputs and real process measurements provided by a real automation system controlling an industrial process;
storing in a futurian database a plurality of forecast control inputs and process measurements provided by a virtual automation system based on a model of the industrial process; and
displaying on an operator display graphically both the past operation of the industrial process up to present time based on data from the historian database and the forecast future operation of the industrial process from the present time onwards based on data from the futurian database.

* * * * *